United States Patent [19]

Han et al.

[11] Patent Number: 5,542,957

[45] Date of Patent: Aug. 6, 1996

[54] RECOVERY OF PLATINUM GROUP METALS AND RHENIUM FROM MATERIALS USING HALOGEN REAGENTS

[75] Inventors: Kenneth N. Han; Xinghui Meng, both of Rapid City, S. Dak.

[73] Assignee: South Dakota School of Mines and Technology, Rapid City, S. Dak.

[21] Appl. No.: 379,809

[22] Filed: Jan. 27, 1995

[51] Int. Cl.⁶ .................................................... C22B 3/46
[52] U.S. Cl. .................. 75/732; 75/744; 423/22; 205/570
[58] Field of Search ............................ 75/710, 732, 736, 75/744; 423/22, 32, 27; 204/111

[56] References Cited

U.S. PATENT DOCUMENTS

| | | |
|---|---|---|
| 3,709,681 | 1/1973 | Wilson et al. . |
| 3,775,099 | 11/1973 | Coffield et al. . |
| 3,778,252 | 12/1973 | Wilson . |
| 3,826,750 | 7/1974 | Wilson . |
| 3,957,505 | 5/1976 | Homick et al. . |
| 3,988,415 | 10/1976 | Barr . |
| 4,070,182 | 1/1978 | Genik-Sas-Berezowsky et al. . |
| 4,093,698 | 6/1978 | Cardwell . |
| 4,137,291 | 1/1979 | Cardwell et al. . |
| 4,146,572 | 3/1979 | Cardwell et al. . |
| 4,269,622 | 5/1981 | Kerley, Jr. . |
| 4,319,923 | 3/1982 | Falanga et al. . |
| 4,369,061 | 1/1983 | Kerley, Jr. . |
| 4,557,759 | 12/1985 | McGrew et al. . |
| 4,654,078 | 3/1987 | Perez et al. . |
| 4,684,404 | 8/1987 | Kalocsai . |
| 4,980,134 | 12/1990 | Butler . |
| 5,114,687 | 5/1992 | Han . |
| 5,139,752 | 8/1992 | Nakao et al. . |
| 5,308,381 | 5/1994 | Han ............................................ 75/744 |
| 5,364,444 | 11/1994 | McDoulett ................................ 423/22 |

OTHER PUBLICATIONS

D. P. Desmond et al., "High–Temperature Cyanide Leaching Of Platinum–Group Metals From Automobile Catalysts–Laboratory Tests", United States Department of the Interior, Bureau of Mines, RI 9384/1991, pp. 1–7.

R. J. Kuczynski et al., "High–Temperature Cyanide Leaching Of Plantinum–Group Metals From Automobile Catalysts–Process Development Unit", United States Department of the Interior, Bureau of Mines, RI 9428/1992, pp. 1–11.

Abdullaev et al., "Autoclave Leaching of Auriferous Sulfide Ore". pp. 25–26 6-6-75.

*Primary Examiner*—Melvyn Andrews
*Attorney, Agent, or Firm*—Lowe, Price, Leblanc & Becker

[57] ABSTRACT

Platinum group metals and rhenium are extracted from their elemental state, complex ores, and other materials such as catalysts by leaching them with a solution containing ammonium halogen salts—iodide and bromide in the presence oxygen and/or sulfuric acid. The invented process is particularly effective for spent catalysts containing precious metals and rhenium in an autoclave at a temperature of 50° C.–300° C.

16 Claims, No Drawings

RECOVERY OF PLATINUM GROUP METALS AND RHENIUM FROM MATERIALS USING HALOGEN REAGENTS

FIELD OF THE INVENTION

The present invention is directed to a method for recovering precious metals such as platinum, palladium, rhodium, gold and rhenium using a leaching solution comprising allergen salts and sulfuric acid and/or ammonium salts.

BACKGROUND ART

Platinum group metals (PGM: platinum, iridium, osmium, palladium, rhodium, and ruthenium) are regarded as strategic metals. These metals are used by various industries in multiple ways including automobile, electrical and electronic, dental and medical, petroleum refining and numerous chemical industries. The major source of the platinum group metals is frequently associated with Cu-Ni deposits. These metals usually occur in conjunction with nonferrous metal sulfide ores. Another source of PGM which is becoming important, especially in the U.S., is the secondary source; namely, scrap of ceramics/glass, electrical components, and spent catalysts.

About 30 million automobiles are scrapped worldwide every year, of which more than 15 million automobiles are junked in the U.S. There are, in general, three grades of automobile catalytic converters in terms of the PGM content. Grade 1 consists of 1200 ppm of Pt, 200 ppm of Pd and 300 ppm Rh; Grade 2 consists of 1000 ppm of Pt, 200 ppm of Pd, and 100 ppm of Rh; while Grade 3 consists of 875 ppm of Pt, 250 ppm Pd and 30 ppm of Rh. On the other hand, petroleum refinery catalyst, typically contain about 3,000 ppm of platinum and 2,600 ppm of rhenium. The petroleum industry consumes about 5% of the total platinum and 30% of the total rhenium demand in the U.S.

PGM are traditionally recovered by aqua regia, $HCl/HNO_3$ or $HCl/Cl_2$. Because platinum-group metals are very inert, their extraction is very expensive. For example, the extraction of these metals from automobile catalysts is known to be notoriously expensive because of the high cost associated with reagent consumption. The methods used to process these metals tend to dissolve even silica and alumina, which are frequently the base matrix of platinum-group metals. As a result, the process suffers from high acid consumption and severe acid corrosion problems. Recently, researchers at the U.S. Bureau of Mines have developed a hydrometallurgical process where cyanide is used in an autoclave at high temperatures and pressures. Although the metallurgical efficiency of this process is reasonably good, it suffers from the disadvantage of using toxic cyanide as the major reagent and low recovery of rhodium. Furthermore, this process also suffers from high reagent consumption.

Researchers at the South Dakota School of Mines and Technology (SDSM&T) have recently developed noble technologies of extracting precious metals including PGM from ores and automobile catalytic converters using ammonia and/or halogen salts (Han et al. U.S. Pat. Nos. 5,114,687; 5,308,381; 5,328,669), all of which herein incorporated by reference in their entirety. These processes teach how well precious metals could be recovered from ores and other materials using environmentally benign reagents. However, the recoveries of rhodium and rhenium are not always very satisfactory.

In view of the inadequate recoveries of certain precious metals in the known prior art processes, a need has developed to provide recovery method which overcome the deficiencies of the prior art. In response to this need, the present invention provides an improved method of recovering or extracting precious metals from both primary and secondary sources which yields increased recovery values, especially for hard to recover elements such as rhodium and rhenium. According to the invention, precious metals are recovered using technology similar to the Han et al. patents cited above with the novel and unobvious use of ammonium salts of halogen and one or more of sulfuric or other mineral acids and an ammonium salt.

SUMMARY OF THE INVENTION

It is an objective of the present invention to provide an improved process for the extraction of platinum group metals, gold and rhenium from various sources including refractory ores, scrap, catalysts, and roasted/smelted products. The current process is substantially free of one or more disadvantages of prior processes.

Another objective is to provide an improved process for the extraction of platinum group metals, gold and rhenium from their ores, scrap, catalysts and roasted/smelted products. Furthermore, it provides a process which does not employ cyanide or strong acids.

Still another objective of the present invention is to provide an improved process for the extraction of platinum group metals, gold and rhenium from various source materials which provides a greater yield of these metals, and one which is less expensive, more economical, and safer than previous processes.

Additional advantages of the present invention will be apparent to those skilled in the art by reference to the following detailed description. The current invention utilizes halogen salts and sulfuric acid and/or ammonium salts as the key solvents to dissolve platinum group metals and rhenium from their solid forms, such as native state, complex ores, scrap, or catalysts.

The new technology geared for extracting PGM and rhenium is based on halogen salts in a confined vessel. In addition to halogen salts, ammonium salts, sulfuric acid and oxygen are also charged. In this process, the consumption of halogen elements is theoretically zero due to continuous recycling of the used reagent. The continuous regeneration of the reagents makes this process unique and noble.

The SDSM&T process works not only for extraction of PGM and rhenium from automobile catalytic converters and petroleum refining catalysts, but also for extraction of gold from refractory gold ores and PGM from platinum bearing ores. However, the current invention is primarily geared toward the efficient extraction of PGM from spent automobile catalytic converters and from other catalysts such as petroleum refining catalyst. However, the applications of the current invention could certainly be extended to the gold and PGM primary industries.

The SDSM&T process claims that platinum group metals, gold and rhenium are extracted from their elemental state, complex ores, and other materials such as catalysts, by leaching them with a solution containing ammonium salts of halogen in presence of sulfuric acid, and oxygen. The salient advantage of this process is the low consumption of the lixiviants due to continuous recycling. For example, iodide will be oxidized to iodine or tri-iodide due to the presence of oxygen under the conditions employed. Iodine is a powerful oxidant which is responsible in extracting metals into the solution. During the course of the extraction process, iodine itself is reduced back to iodide again. This cyclic process continues as long as oxygen is present in the system.

This process has also proven to be excellent for the recovery of gold from refractory gold ores, especially carbonaceous ores. Better than 90% recovery of gold was obtained from numerous refractory gold ores at temperatures less than 180° C. with a leaching time of about 3 hours.

In its broadest embodiment, the inventive process extracts precious metals from precious-metal bearing materials by a leaching process wherein the precious-metal bearing materials, water, ammonium salts of halogen and one or both of sulfuric acid and an ammonium salt are charged to a reaction zone.

The charged reaction zone is heated to a temperature of about 50° C. to about 300° C. under oxidizing conditions at a pressure of from about 30 psig to about 1300 psig forty times sufficient to reach the precious metals from the precious-metal bearing materials thereby producing a slurry containing a precious-metal ion solution. The precious-metal-ion solution is separated from the slurry and the precious metals from the precious-metal-ion solution is recovered using conventional techniques such as electrowinning, cementation, solvent extraction, precipitation and adsorption.

Preferably, the concentration of the ammonium salts of halogen range between 0.01 and 2.0 gram-moles per liter of solution. The preferred sulfuric acid concentration ranges between 0.001 and 1.0 gram-mole per liter of the solution.

DESCRIPTION OF THE PREFERRED EMBODIMENTS

Platinum group metals, gold and rhenium are extracted from their native state, complex ores, refractory ores, automobile catalysts, and other secondary sources by utilizing halogen, oxygen, and sulfuric acid and/or ammonium salts. Instead of a separate ammonium salt, ammonium-iodide and -bromide could be used. The invention is comprised of the following steps. First, these metals or metal-containing materials such as ores or scrap, and a leaching solution containing iodide, bromide or mixture of both, preferably in form of ammonium salts, and oxygen. In addition, sulfuric acid may be required in order to extract rhodium and rhenium effectively from difficult materials. This pulp is then subjected to a pressure vessel or an autoclave to provide a liquid-solid suspension. The suspension is then heated in order to facilitate the dissolution reaction.

Although it is optional, the solid samples are usually reduced in size to increase the metallurgical efficiency of the extraction. Typically, the platinum group metals, gold and rhenium bearing materials are ground to less than 60 mesh.

The leach solution preferably consists of ammonium halogen salts, oxygen, and sulfuric acid. The preferred pH of the solution is between 0.5 and 7.0. Preferably, the concentration of halogen salts or ammonium salts will be 0.01 to 2 gram-moles per liter of the solution and that of sulfuric acid is typically 0.001 to 1.0 gram-mole per liter, when it is needed. The presence of ammonium ion is critical and unique, due to its role of a catalytic effect on the rate of dissolution. The partial pressure of oxygen could be as low as 30 psi (207 kN/m$^2$) or as high as 1300 psi (8970 kN/m$^2$). Instead of oxygen, other oxidants such as hypochlorite, iodine, bromine, and manganese dioxide could be used. However, oxygen is preferred because of its low cost and easy availability. Although preferred salts are disclosed herein, ammonium salts or halogen salts can be utilized in the invention process.

The contents of the pressure vessel or autoclave are then heated to a temperature from about 50° C. to 300° C., preferably between 150° C. and 200° C. Since the overall dissolution reaction is controlled by surface chemical reaction, the dissolution of these metals is very much sensitive to the temperature of the system.

The pressure of the system is at least the corresponding equilibrium water pressure for the temperature employed. However, pressure increases with the amount of oxygen used for the system. The typical pressure to be employed is between 20 and 400 psig (138–2760 kN/m$^2$).

When platinum group metals, gold and rhenium are leached out into the solution, these metals can be removed from the solution via conventional techniques such as solvent extraction, ion exchange, chemical precipitation, cementation, or adsorption.

EXAMPLES

The following specific examples are illustrative but are not limitations of the current invention. It should be understood that similar results could be obtainable with other combinations of conditions other than those specifically considered in the following examples.

In the following examples, we have tested four different types of catalytic converters as a proof of the uniqueness of the invention. These samples are designated as Types I, II, III, and IV for automobile catalytic converters. In addition, a petroleum refinery catalyst sample was also used to demonstrate the applicability of the current technology to other samples than automobile catalytic converters.

TABLE 1

Samples used in this study.

| Type | sample description | Pt | Pd | Rh | Re |
|------|-------------------|----|----|----|----|
| I | 3 way honeycomb (automobile catalyst) | x | x | x | |
| II | 3 way honeycomb (automobile catalyst) | x | x | | |
| III | 3 way honeycomb (automobile catalyst) | x | | x | |
| IV | spherical pellets (automobile catalyst) | x | x | | |
| V | petroleum refining catalyst | x | x | | |

Example I

In this example, the following quantities of the following ingredients were added to an autoclave.

| Item | Ingredient | Quantity |
|------|-----------|----------|
| A. | Type I | 100 grams |
| B. | water | 295 grams |
| C. | sulfuric acid | 8.4 grams |
| D. | ammonium bromide | 30 grams |
| E. | ammonium iodide | 1.5 grams |

Item A was a ground material passing through a US standard screen of 60 mesh per inch from spent automobile catalytic converters and consisted of 560 ppm of platinum, 245 ppm of palladium and 70 ppm of rhodium imbedded in an alumina-silicate matrix of honeycomb structure.

The concentrations of ammonium iodide, ammonium bromide and sulfuric acid were 0.035, 1.0 and 0.29 grammoles per liter, respectively.

The autoclave was closed and oxygen gas added until the partial pressure of oxygen gas in solution reached a level of 87 psig. A stirrer in the autoclave was activated at a speed of 400 rpm. The autoclave and its contents were heated to a temperature of 200° C. and maintained at that temperature for one hour, whereupon the autoclave was cooled, vented to the atmosphere and opened. The contents of the autoclave were found to be a slurry and the final pH of the solution was found to be about 1.2. The solution was then separated from the solid by filtration.

The recovery of platinum, palladium and rhodium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum, palladium and rhodium were found to be 98%, 92% and 97%, respectively. It was noted that the presence of sulfuric acid increased the recovery of rhodium significantly.

Example II

In this example, the following quantities of the following ingredients were added to an autoclave.

| Item | Ingredient | Quantity |
|------|------------|----------|
| A. | Type I | 100 grams |
| B. | water | 395 grams |
| C. | sulfuric acid | 16.7 grams |
| D. | ammonium bromide | 30 grams |
| E. | ammonium iodide | 1 gram |

Item A was a ground material passing through a U.S. standard screen of 60 mesh per inch from spent automobile catalytic converters and consisted of 900 ppm of platinum, 300 ppm of palladium and 150 ppm of rhodium imbedded in an alumina-silicate matrix of honeycomb structure.

The concentrations of ammonium iodide, ammonium bromide and sulfuric acid were 0.017, 1.0 and 0.43 grammoles per liter, respectively.

The autoclave was closed and oxygen gas added until the partial pressure of oxygen gas in solution reached a level of 87 psig. A stirrer in the autoclave was activated at a speed of 400 rpm. The autoclave and its contents were heated to a temperature of 200° C. and maintained at that temperature for one hour, whereupon the autoclave was cooled, vented to the atmosphere and opened. The contents of the autoclave were found to be a slurry and the final pH of the solution was found to be about 0.8. The solution was then separated from the solid by filtration.

The recovery of platinum, palladium and rhodium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum, palladium and rhodium were found to be 98%, 95% and 95%, respectively.

Example III

In this example, the following quantities of the following ingredients were added to an autoclave.

| Item | Ingredient | Quantity |
|------|------------|----------|
| A. | Type II | 50 grams |
| B. | water | 395 grams |
| C. | sulfuric acid | 8.4 grams |
| D. | ammonium bromide | 40 grams |
| E. | ammonium iodide | 2 grams |

Item A was a ground material passing through a U.S. standard screen of 60 mesh per inch from spent automobile catalytic converters and consisted of 1,200 ppm of platinum and 540 ppm of palladium imbedded in an alumina-silicate matrix of honeycomb structure.

The concentrations of ammonium iodide, ammonium bromide and sulfuric acid were 0.035, 1.0 and 0.21 grammoles per liter, respectively.

The autoclave was closed and oxygen gas added until the partial pressure of oxygen gas in solution reached a level of 87 psig. A stirrer in the autoclave was activated at a speed of 400 rpm. The autoclave and its contents were heated to a temperature of 200° C. and maintained at that temperature for one hour, whereupon the autoclave was cooled, vented to the atmosphere and opened. The contents of the autoclave were found to be a slurry and the final pH of the solution was found to be about 1.2. The solution was then separated from the solid by filtration.

The recovery of platinum and palladium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum and palladium were found to be 99% and 97%, respectively.

Example IV

In this example, the following quantities of the following ingredients were added to an autoclave.

| Item | Ingredient | Quantity |
|------|------------|----------|
| A. | Type III | 50 grams |
| B. | water | 395 grams |
| C. | sulfuric acid | 8.4 grams |
| D. | ammonium bromide | 40 grams |
| E. | ammonium iodide | 1.5 grams |

Item A was a ground material passing through a U.S. standard screen of 60 mesh per inch from spent automobile catalytic converters and consisted of 1,300 ppm of platinum and 123 ppm of rhodium imbedded in an alumina-silicate matrix of honeycomb structure.

The concentrations of ammonium iodide, ammonium bromide and sulfuric acid were 0.026, 1.0 and 0.21 grammoles per liter, respectively.

The autoclave was closed and oxygen gas added until the partial pressure of oxygen gas in solution reached a level of 87 psig. A stirrer in the autoclave was activated at a speed of 400 rpm. The autoclave and its contents were heated to a temperature of 200° C. and maintained at that temperature for one hour, whereupon the autoclave was cooled, vented to the atmosphere and opened. The contents of the autoclave were found to be a slurry and the final pH of the solution was found to be about 1.2. The solution was then separated from the solid by filtration.

The recovery of platinum and palladium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum and rhodium were found to be 98% and 95%, respectively.

Example V

In this example, the following quantities of the following ingredients were added to an autoclave.

| Item | Ingredient | Quantity |
| --- | --- | --- |
| A. | Type II | 50 grams |
| B. | water | 400 grams |
| C. | ammonium sulfate | 56 grams |
| D. | ammonium iodide | 6 grams |

Item A was a ground material passing through a U.S. standard screen of 60 mesh per inch from spent automobile catalytic converters and consisted of 1,200 ppm of platinum and 540 ppm of palladium imbedded in an alumina-silicate matrix of honeycomb structure.

The concentrations of ammonium iodide, ammonium sulfate were 0.1 and 1.0 gram-moles per liter, respectively. The initial pH of the solution was 5.6.

The autoclave was closed and oxygen gas added until the partial pressure of oxygen gas in solution reached a level of 116 psig. A stirrer in the autoclave was activated at a speed of 400 rpm. The autoclave and its contents were heated to a temperature of 180° C. and maintained at that temperature for three hours, whereupon the autoclave was cooled, vented to the atmosphere and opened. The contents of the autoclave were found to be a slurry and the final pH of the solution was found to be about 8.0. The solution was then separated from the solid by filtration.

The recovery of platinum and palladium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum and palladium were found to be 94% and 93%, respectively. It should be noted that the pH of the solution was relatively high as a result of the absence of sulfuric acid.

Example VI

In this example, the following quantities of the following ingredients were added to an autoclave.

| Item | Ingredient | Quantity |
| --- | --- | --- |
| A. | Type IV | 50 grams |
| B. | water | 395 grams |
| C. | ammonium sulfate | 56 grams |
| D. | ammonium iodide | 6.6 grams |

Item A was a ground material passing through a U.S. standard screen of 60 mesh per inch from spent automobile catalytic converters and consisted of 400 ppm of platinum and 130 ppm of palladium imbedded in an alumina matrix of spherical pellet shape.

The concentrations of ammonium iodide and ammonium sulfate were 0.11 and 1.0 gram-mole per liter, respectively. The initial pH of the solution was 5.6. It should be noted that when there is no rhodium present in the catalyst, there is no need to add sulfuric acid, hence the pH of the solution could be relatively high without damaging the overall recovery of precious metals.

The autoclave was closed and oxygen gas added until the partial pressure of oxygen gas in solution reached a level of 87 psig. A stirrer in the autoclave was activated at a speed of 400 rpm. The autoclave and its contents were heated to a temperature of 160° C. and maintained at that temperature for three hours, whereupon the autoclave was cooled, vented to the atmosphere and opened. The contents of the autoclave were found to be a slurry and the final pH of the solution was found to be about 8.0. The solution was then separated from the solid by filtration.

The recovery of platinum and palladium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum and palladium were found to be 96% and 95%, respectively.

Example VII

In this example, the following quantities of the following ingredients were added to an autoclave.

| Item | Ingredient | Quantity |
| --- | --- | --- |
| A. | Petroleum refining catalyst | 20 grams |
| B. | water | 400 grams |
| C. | ammonium sulfate | 32 grams |
| D. | ammonium iodide | 6 grams |

Item A was a ground material passing through a U.S. standard screen of 60 mesh per inch from spent automobile catalytic converters and consisted of 2,950 ppm of platinum and 2,500 ppm of rhenium imbedded in alumina matrix of pellet shape.

The concentrations of ammonium iodide and ammonium sulfate were 0.1 and 0.6 gram-moles per liter, respectively.

The autoclave was closed and oxygen gas added until the partial pressure of oxygen gas in solution reached a level of 116 psig. A stirrer in the autoclave was activated at a speed of 400 rpm. The autoclave and its contents were heated to a temperature of 160° C. and maintained at that temperature for two hours, whereupon the autoclave was cooled, vented to the atmosphere and opened. The contents of the autoclave were found to be a slurry and the final pH of the solution was found to be about 6.0. The solution was then separated from the solid by filtration.

The recovery of platinum and rhenium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum and rhenium were found to be 45% and 98%, respectively.

EXAMPLE VIII

In this example, the following quantities of the following ingredients were added to an autoclave.

| Item | Ingredient | Quantity |
|------|------------|----------|
| A. | Petroleum refining catalyst | 20 grams |
| B. | water | 395 grams |
| C. | sulfuric acid | 8.4 grams |
| D. | ammonium bromide | 20 grams |
| E. | ammonium iodide | 2 grams |

Item A was a ground material passing through a U.S. standard screen of 60 mesh per inch from spent automobile catalytic converters and consisted of 2,950 ppm of platinum and 2,500 ppm of rhenium imbedded in alumina matrix of pellet shape.

The concentrations of ammonium iodide and ammonium bromide and sulfuric acid were 0.035, 0.5 and 0.21 gram-moles per liter, respectively.

The autoclave was closed and oxygen gas added until the partial pressure of oxygen gas in solution reached a level of 87 psig. A stirrer in the autoclave was activated at a speed of 400 rpm. The autoclave and its contents were heated to a temperature of 200° C. and maintained at that temperature for one hour, whereupon the autoclave was cooled, vented to the atmosphere and opened. The contents of the autoclave were found to be a slurry and the final pH of the solution was found to be about 1.2. The solution was then separated from the solid by filtration.

The recovery of platinum and palladium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum and rhenium were found to be 98% and 98%, respectively. These results are much better than those of Example VII, in which no sulfuric acid was added into the system.

Description of Claims

It should be mentioned that this invention is not to be regarded as limited to the expressed procedure or materials set forth here. The above detailed examples are given only by way of illustration and to aid in clarifying the invention. The authors do not regard such specific details as essential to the invention except insofar as they are expressed by way of limitation in the following claims. It is the authors' intention to claim all novelty inherent in the invention as broadly as is permissible in view of the prior art.

What is claimed is:

1. A process for the extraction of precious metals from precious-metal bearing materials by a leaching process comprising the steps of:
   I. charging to a reaction zone a charge comprising:
      A. precious-metal bearing materials;
      B. water;
      C. elemental halogen or halogen salts;
      D. sulfuric acid and one of ammonia or an ammonium salt; to form a charge in said reaction zone; and
   II. heating the charge in said reaction zone to a temperature of about 50° C. to about 300° C. under oxidizing conditions at a pressure of from about 30 psig to about 1300 psig for a time sufficient to leach the precious metals from the precious-metal bearing materials thereby producing a slurry containing a precious-metal-ion-solution; and
   III. separating the precious-metal-ion solution from the slurry; and
   IV. recovering the precious metals from the precious-metal-ion-solution using one of electrowinning, cementation, solvent extraction, precipitation and adsorption.

2. The process of claim 1 wherein precious-metal bearing materials are leached in a 0.01–2.0 gram-moles per liter of ammonium salts of halogen are selected from the group consisting of ammonium iodide, ammonium bromide or a mixture thereof of iodide and/or bromide.

3. The process of claim 2 wherein the PGM and precious-metal bearing materials are leached in a 0.001–1.0 gram-mole per liter of sulfuric acid solution.

4. The process of claim 1 wherein the solid-liquid suspension in the pressure vessel is maintained at a temperature of at least 50° C. up to 300° C. for at least 0.5 hours up to about 5 hours.

5. The process of claims 1 wherein the pH of the solution can be between 0.5 and 10 with the optimum pH being 1–8.

6. The process of claims 2 wherein the pH of the solution can be between 0.5 and 10 with the optimum pH being 1–8.

7. The process of claim 1 wherein oxygen is supplied to the reacting zone.

8. The process of claim 7 wherein the initial partial pressure of oxygen is 30 psi (207 kN/m$^2$) and up to 1300 psi (8970 kN/m$^2$).

9. The method of recovering platinum group metals and rhenium bearing materials from precious-metal bearing materials by a method comprised of the following steps:
   I. grinding the precious-metal bearing materials,
   II. charging the ground materials and an aqueous leach solution to a pressure vessel whereby a solid-liquid suspension is formed; the leach solution containing ammonium salts of halogen, sulfuric acid, and an oxidant,
   III. heating the solid-liquid suspension in the pressure vessel under oxidizing conditions to a temperature between about 50° C. and 300° C., wherein the maximum pressure attained in the pressure vessel is at least 30 psig up to about 1,300 psig, whereby platinum group metals and rhenium are selectively leached from the precious-metal bearing materials,
   IV. cooling the solid-liquid suspension to a lower temperature,
   V. separating the platinum group metals and rhenium bearing leach solution from the solid-liquid suspension, and
   VI. recovering the platinum group metals and rhenium from the leach solution using one of electrowinning, cementation, solvent extraction, precipitation and adsorption.

10. The process of claim 9 wherein oxygen is used as said oxidant.

11. The process of claim 9 wherein said halogen salts are selected from the group consisting of ammonium iodide, ammonium bromide and mixtures thereof.

12. The process of claim 11 wherein the concentration of said ammonium salts of iodide and bromide is 0.005 to about 1.0 gram-moles per liter.

13. The process of claim 9 further comprising the step of changing ammonium salts to said pressure vessel in a concentration of 0.005 to 2.0 gram-moles per liter.

14. The process of claim 10 wherein the partial pressure of oxygen is 30 psi (207 kN/m$^2$) and up to 1300 psi (8970 kN/$^2$).

15. The process of claim 1 further comprising the step of charging an ammonium salt to said reaction zone.

16. The process of claim 15 wherein the concentration of said ammonium salts is between 0.01 and 2 gram-moles per liter.

* * * * *